United States Patent [19]

Morishima et al.

[11] Patent Number: 6,080,812
[45] Date of Patent: Jun. 27, 2000

[54] WATER-DISPERSIBLE BLOCKED ISOCYANATE COMPOSITION, AND WATER-BASE PAINT COMPOSITION AND WATER-BASE ADHESIVE COMPOSITION USING THE SAME

[75] Inventors: Takeshi Morishima; Shogo Itoh, both of Yokohama; Shin Konishi, Fujisawa, all of Japan

[73] Assignee: Nippon Polyurethane Industry C. Ltd., Tokyo, Japan

[21] Appl. No.: 09/373,543

[22] Filed: Aug. 13, 1999

Related U.S. Application Data

[63] Continuation of application No. 08/946,216, Oct. 7, 1997, Pat. No. 5,998,539.

[30] Foreign Application Priority Data

Oct. 8, 1996 [JP] Japan ..................................... 8-286050

[51] Int. Cl.[7] ............................... C08J 3/00; C08K 3/20; C08L 75/00; C08G 18/81
[52] U.S. Cl. ........................ 524/591; 524/589; 524/590; 524/839; 524/840; 528/45
[58] Field of Search ..................................... 524/589, 590, 524/591, 839, 840; 528/45

[56] References Cited

U.S. PATENT DOCUMENTS

| | | |
|---|---|---|
| 4,663,377 | 5/1987 | Hombach et al. . |
| 5,300,556 | 4/1994 | Tirpak et al. . |
| 5,373,050 | 12/1994 | Morikawa et al. . |
| 5,652,300 | 7/1997 | Morikawa et al. . |
| 5,723,536 | 3/1998 | Baumbach et al. . |

FOREIGN PATENT DOCUMENTS

| | | |
|---|---|---|
| 0 013 112 | 7/1980 | European Pat. Off. . |
| 3 807 555 | 9/1988 | Germany . |
| 6 131 422 | 2/1986 | Japan . |
| 680 104 | 10/1994 | Japan . |
| 748 429 | 2/1995 | Japan . |

*Primary Examiner*—Patrick D. Niland
*Attorney, Agent, or Firm*—Browdy and Neimark

[57] ABSTRACT

A water-dispersible blocked isocyanate composition, including an isocyanate group-terminated precursor and a blocking agent for blocking a free isocyanate group of the precursor, wherein the precursor includes at least an organic diisocyanate, a low-molecular glycol, and a hydrophilic surfactant having at least one active hydrogen group. The precursor also has an isocyanurate ring structure; an average functional group number (f) satisfying $2.0 \leq f \leq 4.2$; a low-molecular glycol content (X) satisfying $0.5$ wt. $\% \leq x \leq 15$ wt. %; and a hydrophilic surfactant content (Y) satisfying $0.1$ wt. $\% \leq Y \leq 50$ wt. %.

24 Claims, No Drawings

WATER-DISPERSIBLE BLOCKED ISOCYANATE COMPOSITION, AND WATER-BASE PAINT COMPOSITION AND WATER-BASE ADHESIVE COMPOSITION USING THE SAME

CROSS-REFERENCE TO RELATED APPLICATIONS

This is a continuation of parent application Ser. No. 08/946,216, originally filed on Oct. 7, 1997, and then re-filed as a CPA on Apr. 12, 1999, Now U.S. Pat. No. 5,998,539.

BACKGROUND OF THE INVENTION

1. Field of the Invention

The present invention relates to a water-dispersible blocked isocyanate composition, a water-base paint (or distemper) composition and a water-base adhesive composition mainly containing a water-base (or aqueous) resin.

2. Related Background Art

Heretofore, there have widely been used various paints, adhesives, and coating materials containing an organic solvent having a good power to dissolve a polymer. However, the organic solvent contained in these paints, etc., can cause various problems such as adverse effect on a human organism, safety or hygiene problems inclusive of explosion, fire hazard, etc., and pollution problems inclusive of air pollution.

Accordingly, in recent years, in order to solve the above-mentioned problems caused by the use of the organic solvent, there have actively been developed paints, etc., of a "water-base" system using substantially no organic solvent.

In the water-base system, there has heretofore been used a water-base resin such as aqueous solution of a water-soluble polymer, and aqueous dispersion, aqueous emulsion, or aqueous suspension which have been obtained by dispersing a water-dispersible polymer in water. However, in many cases, such a water-base system (one-liquid or one-component system) only using the above water-base resin cannot provide various properties which are required for the above paints, etc. Therefore, in general, a crosslinking agent is used in combination with the water-base resin for the purpose of improving the resultant weather resistance, adhesion property, etc.

As an example using such a crosslinking agent, there is known a system (two-liquid or two-component system) using a curing agent (or hardening agent) having a free isocyanate group, in combination with the above-mentioned water-base resin. However, the two-liquid system has a limitation such that it only has a short work life (or pot life) after the mixing of the curing agent with the above polymer component, and therefore this system has a problem in view of the workability or usability thereof.

As an example the measure for alleviating the above defect of the two-liquid system, there is known a method of using a water-dispersible blocked isocyanate as the above-mentioned crosslinking agent. This is a system wherein a paint, etc., is heated at the time of the use thereof to dissociate the blocking agent and regenerate the free isocyanate, and then the resultant isocyanate is caused to react with an active hydrogen group of the polymer component constituting the water-base resin to convert the polymer into a network structure. In the system using such a water-dispersible blocked isocyanate, since the isocyanate group is blocked, the work life of the system is not limited, unlike in the case of the two-liquid system using the free isocyanate.

As specific examples of the system using the water-dispersible blocked isocyanate, those as described in Japanese Laid-Open Patent Application Nos. Sho 61-31422 (i.e., 31422/1986) and Hei 4-159260 (i.e., 159260/1992) are known. A hydrophilic surfactant has been introduced into the blocked isocyanate used in these references, for the purpose of improving the dispersion stability thereof at the time at which the blocked isocyanate is mixed with an aqueous solution of a water-soluble polymer or a water-base emulsion.

In recent years, the requirement for the resultant product of a paint, etc., becomes severer, and therefore the requirement for the appearance of a (dry) paint film (especially, gloss and definition or sharpness) also becomes severer. In such a viewpoint, there has been desired a further improvement in, the performance of the water-dispersible blocked isocyanate as described in the above-mentioned Japanese Laid-Open Patent Application Nos. Sho 61-31422 and Hei 4-159260.

SUMMARY OF THE INVENTION

As a result of earnest study, the present inventors have found that an improvement in the compatibility of the resin constituting a main component (water-base resin) in a water-base two-liquid system, with a water-dispersible blocked isocyanate composition (especially, a hydrophilic surfactant portion of such an isocyanate) is extremely effective in improving the appearance of a paint film (especially, in improving the gloss or definition thereof).

As a result of further study based on such a discovery, the present inventors have also found that a well-balanced introduction of a low-molecular (weight) glycol and a hydrophilic surfactant into a water-dispersible blocked isocyanate as well as a further introduction of an isocyanurate ring structure into the isocyanate, not only provides a paint film which is excellent in gloss and definition, but also improves the weather resistance and heat resistance of the paint film.

The water-dispersible blocked isocyanate according to the present invention is based on the above discovery, and comprises: an isocyanate group-terminated precursor and a blocking agent for blocking a free isocyanate group of the precursor; the isocyanate group-terminated precursor comprising at least an organic diisocyanate, a low-molecular glycol, and a hydrophilic surfactant having at least one active hydrogen group; the precursor having:

an isocyanurate ring structure;
an average functional group number (f) satisfying $2.0 \leq f \leq 4.2$;
a low-molecular glycol content (X) satisfying 0.5 wt. $\% \leq X \leq 15$ wt. %; and
a hydrophilic surfactant content (Y) satisfying 0.1 wt. $\% \leq Y \leq 50$ wt. %.

The present invention also provides a water-dispersible blocked isocyanate composition, comprising an isocyanate group-terminated precursor and a blocking agent for blocking a free isocyanate group of the precursor; the isocyanate group-terminated precursor comprising at least an organic diisocyanate, a low-molecular glycol, a hydrophilic surfactant having at least one active hydrogen group, and a hydrophobic organic compound having at least one active hydrogen group and a carbon number of 7 or more; the precursor having:

an isocyanurate ring structure;
an average functional group number (f) satisfying $2.0 \leq f \leq 4.2$;

a low-molecular glycol content (X) satisfying 0.5 wt. %≦X≦15 wt. %;

a hydrophilic surfactant content(Y) satisfying 0.1 wt. %≦Y≦50 wt. %; and of hydrophobic organic compound content(Z) satisfying 0 wt. %<Z≦30.

The present invention further provides a water-dispersible blocked isocyanate composition, comprising an isocyanate group-terminated precursor and a blocking agent for blocking a free isocyanate group of the precursor; the isocyanate group-terminated precursor comprising at least an organic diisocyanate, a low-molecular glycol, and a hydrophilic surfactant having at least one active hydrogen group;

the blocked isocyanate composition having a viscosity of 100–100,000 mPa.s/25° C. in the state of a solution in an organic solvent having a solid content of 80%.

The present invention further provides a water-dispersible blocked isocyanate composition, comprising an isocyanate group-terminated precursor and a blocking agent for blocking a free isocyanate group of the precursor; the isocyanate group-terminated precursor comprising at least an organic diisocyanate, a low-molecular glycol, and a hydrophilic surfactant having at least one active hydrogen group;

the blocked isocyanate composition having an effective NCO content of 4.0–15.0 wt. % in the state of a solution in an organic solvent having a solid content of 80%.

The present invention further provides a water-dispersible blocked isocyanate composition, comprising an isocyanate group-terminated precursor and a blocking agent for blocking a free isocyanate group of the precursor; the isocyanate group-terminated precursor comprising at least an organic diisocyanate, a low-molecular glycol, and a hydrophilic surfactant having at least one active hydrogen group;

the blocked isocyanate composition having a gloss of 60–100 in the state of a paint for gloss measurement at an incidence angle of 60° and a reflection angle of 60°.

The present invention further provides a water-base paint composition, comprising at least a water-dispersible blocked isocyanate composition, and a water-base resin having an active hydrogen group, wherein the mole (number) of the blocked isocyanate groups in the water-dispersible blocked isocyanate composition, and the mole of the active hydrogen groups of the resin constituting the water-base resin being 1:9 to 9:1;

the blocked isocyanate composition comprising an isocyanate group-terminated precursor and a blocking agent for blocking a free isocyanate group of the precursor; the isocyanate group-terminated precursor comprising at least an organic diisocyanate, a low-molecular glycol, and a hydrophilic surfactant having at least one active hydrogen group.

The present invention further provides a water-base adhesive composition, comprising at least a water-dispersible blocked isocyanate composition, and a water-base resin having an active hydrogen group, wherein the mole of the blocked isocyanate groups in the water-dispersible blocked isocyanate composition, and the mole of the active hydrogen groups of the resin constituting the water-base resin being 1:9 to 9:1;

the blocked isocyanate composition comprising an isocyanate group-terminated precursor and a blocking agent for blocking a free isocyanate group of the precursor; the isocyanate group-terminated precursor comprising at least an organic diisocyanate, a low-molecular glycol, and a hydrophilic surfactant having at least one active hydrogen group.

According to the present inventors' knowledge, it is presumed that since the low-molecular glycol and the hydrophilic surfactant (further, the hydrophobic chain having an appropriate chain length, as desired) are introduced in a well-balanced manner into the above-mentioned water-dispersible blocked isocyanate composition according to the present invention, not only a uniform or homogeneous formulation liquid can be prepared on the basis of an improvement in the dispersibility of the blocked isocyanate molecule contained in the water-base resin (a main component), but also the compatibility of the main component with the molecular skeleton (or framework) of the blocked isocyanate is markedly improved, thereby to drastically improve the gloss and definition of the resultant paint film.

According to the present inventors' knowledge, it is also presumed that blocked isocyanate composition according to the present invention, even when the blocking agent of the isocyanate group is released by heating, etc., the hydrophilic group bound to another isocyanate group (in an embodiment wherein a hydrophobic group having an appropriate chain length has been introduced into the isocyanate, the hydrophilic group and/or hydrophobic group) is not substantially released from the isocyanate group. Thus, it is presumed that, even after the blocking group is released from the isocyanate group, the blocked isocyanate of the present invention may maintain a preferred balance between the hydrophilic property and the hydrophobic property with respect to the water-base resin constituting a main component of the paint, etc.

On the contrary, according to the present inventors' knowledge, it is presumed that a conventional blocked isocyanate to which only a hydrophilic surfactant has been introduced provides a paint film appearance poor in gloss and definition, based on a low compatibility between the resin constituting a main component (water-base resin) and such a water-dispersible blocked isocyanate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

Hereinbelow, the present invention will be described in detail. In the description appearing hereinafter, "part(s)" and "%" used for describing quantities are by weight unless otherwise noted, specifically.

(Water-dispersible blocked isocyanate)

The water-dispersible blocked isocyanate according to the present invention is a blocked isocyanate which comprises an isocyanate group-terminated precursor (i.e., a precursor having at least one isocyanate group as an end or terminal group thereof), and a blocking agent for blocking a free isocyanate group of the precursor.

(Isocyanate group-terminated precursor)

In the present invention, the above-mentioned isocyanate group-terminated precursor is an isocyanate group-terminated precursor comprising, at least, an organic diisocyanate portion, a low-molecular glycol portion, and a hydrophilic surfactant portion having at least one active hydrogen group.

(Organic diisocyanate)

Specific examples of the above organic diisocyanate to be usable for the present invention may include: aromatic isocyanates such as 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 4,4'-diphenyl ether diisocyanate, 2-nitro diphenyl-4,4'-diisocyanate, 2,2'-diphenyl propane-4,4'-diisocyanate, 3,3'-dimethyl diphenylmethane-4,4'-diisocyanate, 4,4'-diphenylpropane diisocyanate, m-phenylene diisocyanate, p-phenylene diisocyanate, naphthylene 1,4-diisocyanate, naphthylene-1,5- diisocyanate, and 3,3'-dimethoxy diphenyl-4,4'-diisocyanate; aliphatic isocyanates such as hexamethylene-1,6- diisocyanate (hereinafter, abbreviated as "HDI"), 1,4- tetramethylene diisocyanate, 2-methyl pentane-1,5-diisocyanate, and lysine diisocyanate; aralkyl diisocyanates such as xylylene-1,4-diisocyanate, and xylylene-1,3-diisocyanate; alicyclic diisocyanates such as isophorone diisocyanate (hereinafter, abbreviated as "IPDI"), hydrogenated tolylene diisocyanate, hydrogenated xylene diisocyanate, hydrogenated diphenylmethane diisocyanate, and hydrogenated tetramethylxylene diisocyanate.

These organic diisocyanate may be used either singly or as a mixture of two or more kinds species thereof. Further, for example, it is also possible to use, as desired, various kinds of modified products of these organic diisocyanates such as adduct-modified product, buret-modified product, carbodiimide-modified product, uretdion-modified product, and uretimine-modified product.

Among these, in view of the dispersion stability in water, weather resistance after dispersion thereof in water, etc., it is further preferred to use anon-yellowing isocyanate such as HDI (hexamethylene diisocyanate) or modified products thereof (particularly, isocyanurate-modified product of HDI).

In order to cause the water-dispersible blocked isocyanate composition to have a suitable effective NCO content, the low molecular glycol usable in the present invention may preferably be one having a molecular weight of 62–500 (more preferably, 75–250). The "effective NCO content" used in the present invention refers to the content of the NCO group of the resultant polyisocyanate which remains in the blocked isocyanate composition after the removal of the blocking agent therefrom.

Specific examples of the low-molecular glycol to be usable in the present invention may include: ethylene glycol, 1,2-propanediol, 1,3-propanediol, 1,2-butanediol, 1,3-butanediol, 1,4-butanediol, 1,5-pentanediol, 2-methyl-1,5-pentanediol, 3-methyl-1,5-pentanediol, 1,6-hexanediol, 1,8-octanediol, 1,9-nonanediol, neopentyl glycol, 2,2-diethyl-1,3-propanediol, 2-n-butyl-2-ethyl-1,3-propanediol, 2,2,4-trimethyl-1,3-pentanediol, 2-ethyl-1,3-hexanediol, 2-n-hexadecane-1,2-ethylene glycol, 2-n-eicosane-1,2-ethylene glycol, 2-n-octacosane-1,2-ethylene glycol, hydrogenated bisphenol-A, diethylene glycol, dipropylene glycol, 3-hydroxy-2,2-dimethylpropyl-3-hydroxy-2,2-dimethylprop ionate, etc. These glycol may be used either singly or in a combination of two or more species thereof, as desired.

Among these low-molecular glycols, it is particularly preferred to use a low-molecular glycol having a side chain, in view of the compatibility with the water-base resin. Specific example of such a low-molecular glycol having a side chain may include: 1,2-propanediol, 1,2-butanediol, 1,3- butanediol, neopentyl glycol, 2-n-butyl-2-ethyl-1,3-propanediol, etc.

Alternatively, in the present invention, it is also possible to use a polyol having 3 or more functional groups and a molecular weight of 500 or less, such as glycerin, trimethylol propane, and pentaerythritol. However, it is preferred to determine the amount of such a polyol to be used, in consideration of the reactivity ratio of a reactive group, and/or a "gel formation theory" based on the theoretical calculation by J. P. Flory, Khun, etc.

The above-mentioned low-molecular glycol has a hydrocarbon group in the molecular skeleton thereof, and the compatibility of an isocyanate with the molecular skeleton of the resin constituting the water-base resin is improved by introducing the low-molecular glycol into the isocyanate molecule. Therefore, the gloss and definition of the resultant paint film are improved, when the above isocyanate molecule is converted into the paint film. In addition, the low-molecular glycol is bifunctional and it will be introduced not into the end portion of the self-emulsifying type polyisocyanate molecule, but into a central portion of the molecular chain (or in the neighborhood thereof) of such a self-emulsifying type polyisocyanate molecule, whereby such introduction also contributes to an improvement in the compatibility from this point.

In the present invention, when an isocyanurate ring structure is introduced into the water-dispersible blocked isocyanate, e.g., it is preferred to convert an isocyanate group-terminated prepolymer which has been obtained by the urethane-forming reaction of a low-molecular glycol, into an isocyanurate form. In this case, the resultant urethane bond produces a catalytic effect on the isocyanurate-forming reaction, and therefore the reaction occurs uniformly in the entire reaction system. As a result, it is possible to promote the reaction smoothly without producing a partially gel-forming product (or polymeric product).

(Hydrophilic surfactant)

The hydrophilic surfactant to be used in the present invention is not particularly limited, but may be one or more species thereof which are appropriately selected from those known in the art. Specific examples of such a hydrophilic surfactant may include: nonionic surfactants such as poly (oxyalkylene) ether; anionic hydrophilic surfactants such as those having a functional group of —COOM, —SO$_3$M (wherein "M" denotes an alkali metal, an ammonium group, an organic amine group, etc.); cationic hydrophilic surfactants such as quaternary ammonium compound.

(Nonionic hydrophilic surfactant)

Specific examples of the above nonionic surfactant may include: polyoxyalkylene fatty acid ester or poly (oxyalkylene) ether containing at least one active hydrogen group, etc.

Specific examples of the active hydrogen group-containing compound usable as an initiator in the preparation of the above poly(oxyalkylene) ether may include: methanol, n-butanol, cyclohexanol, phenol, ethylene glycol, propylene glycol, aniline, trimethylol propane, glycerin, etc. Among these, in view of the dispersion stability of the isocyanate, it is preferred to use an alcohol having a smaller molecular weight (more preferably, a molecular weight of 80 or less), such as methanol, ethanol, and ethylene glycol so as to enhance the hydrophilic property of the isocyanate.

On the other hand, specific examples of the fatty acid to be usable for the preparation of the above polyoxyalkylene fatty acid ester may include: acetic acid, propionic acid, butyric acid, etc. Among these, in view of the dispersion stability, it is preferred to use a lower fatty acid (more preferably, one having a carbon number of four or less) so as to enhance the hydrophilic property.

The polyether which is present in the poly (oxyalkylene) ether, polyoxyalkylene fatty acid ester, etc., may preferably have a degree of polymerization of 3–90, more preferably 5–50. As the polyether, it is possible to use either a pure (or homogeneous) ethylene oxide chain and/or mixed alkylene oxide chain (more preferably, one containing 70 (mole) % or more of ethylene oxide unit in the total alkylene oxide unit).

(Anionic hydrophilic surfactant)

The above-mentioned anionic hydrophilic surfactant may generally comprise an organic acid having at least one active hydrogen group, and a neutralizing agent. The organic acid and the neutralizing agent, respectively, may be used singly or as a mixture of two or more species thereof. Specific examples of the organic acid may include: hydroxyl fatty acids such as α-hydroxypropionic acid, hydroxysuccinic acid, dihydroxysuccinic acid, ε-hydroxypropane-1,2,3-tricarbo xylic acid, hydroxyacetic acid, α-hydroxy butyric acid, hydroxy stearic acid, recinoleic acid, recino-elaidic acid, recino-stealolic acid, salicylic acid, and mandelic acid; hydroxy fatty acid which has been obtained by converting an unsaturated fatty acid such as oleic acid, recinoleic acid, and linoleic acid, into a hydroxylated derivative thereof; diamine-type amino acids such as glutamine, asparagine, lysine, diamino propionic acid, ornithine, diaminobenzoic acid, and diamino benzenesulfonic acid; monoamine-type amino acids such as glycine, alanine, glutamic acid, taurine, amino caproic acid, aminobenzoic acid, amino isophthalic acid, and sulfamic acid; or carboxylic acid-containing polyols such as 2,2-dimethylol propionic acid, 2,2-dimethylol butyric acid, and 2,2-dimethylol valeric acid; an adduct of iminodiacetic acid and glycidol, polyester polyol obtained by using 5-hydroxy sulfo isophthalic acid, polycaprolactone polyol obtained by using a carboxylic acid-containing polyol as an initiator, or an ester-interchange product of polyester polyol or polycarbonate polyol with a carboxylic acid-containing polyol, etc.

As the above organic acid, it is also possible to use polymer polyols having a number-average molecular weight of more than 500 to 10,000, such as polyester polyol, polyether polyol, polycarbonate polyol, and polyolefin polyol; a half ester mixture or half amide mixture (containing a carboxyl group) which is obtained by reacting a polycarboxylic acid anhydride with a polyamine or a low-molecular polyol such as the above-mentioned low-molecular glycol, trimethylol propane, and glycerin.

For example, when a polyol is subjected to an addition reaction with a dianhydride such as pyromellitic anhydride, two carboxylic acid groups are formed, whereby a hydrophilic polar group may be introduced into the molecular chain of the polyester polyol. Further, it is possible to use a phosphoric acid group as an anionic hydrophilic group to be usable in the present invention.

The polyester polyol as a kind of the above-mentioned polymer polyol may for example be obtained in a known manner from the above-mentioned low-molecular polyol, and a polycarboxylic acid, such as phthalic acid, isophthalic acid, terephthalic acid, succinic acid, malonic acid, oxalic acid, glutaric acid, adipic acid, pimelic acid, suberic acid, azelaic acid, sebasic acid, maleic acid, fumaric acid, trimellitic acid, and pyromellitic acid; or acid anhydride thereof.

As the polyether polyol, for example, it is possible to use a product which is obtained by addition polymerization reaction of an alkylene oxide with one or a mixture of two or more species selected from compounds having two or more active hydrogen groups such as the above-mentioned low-molecular polyol and polyamine.

Specific examples of the polycarbonate polyol may include: a polyol which may be obtained by a phenol-removing reaction of a low-molecular polyol to be usable for the above-mentioned polyester polyol, with diphenyl carbonate; a polyol which may be obtained by an alcohol-removing reaction of the above-mentioned low-molecular polyol with dialkyl carbonate; etc.

Specific examples of the polyolefin polyol may include: hydroxyl group-containing butadiene, hydroxyl group-containing polyisoprene, hydroxyl group-containing hydrogenated butadiene, hydroxyl group-containing hydrogenated polyisoprene, hydroxy group-containing chlorinated polyethylene, hydroxyl group-containing chlorinated polypropylene, etc.

Specific examples of the above "neutralizing agent" constituting the anionic surfactant in combination with the above organic acid, may include: ammonia; organic amines such as, ethylamine, trimethylamine, triethylamine, trisopropylamine, tributylamine, triethanolamine, -methyl diethanolamine, N-phenyl diethanolamine, monoethanolamine, dimethyl ethanolamine, diethyl ethanolamine, morpholine, N-methyl morpholine, and 2-amino-2-ethyl-1-propanol; alkali metals such as lithium, potassium, and sodium; inorganic alkali such as sodium hydroxide, and potassium hydroxide. Among these, in order to improve the weather resistance or water resistance of the resultant paint film after drying, it is preferred to use one having a high volatility which may easily be dissociated by heat, such as ammonia or a lower amine having a carbon number of nine or less in terms of the total carbon number of the organic group(s) thereof, such as trimethylamine, and triethylamine.

(Cationic hydrophilic surfactant)

The above-mentioned cationic hydrophilic surfactant may generally comprise a compound (cationic hydrophilic polar group-containing compound) containing at least one active hydrogen group which is reactive with an isocyanate group. For example, the cationic hydrophilic polar group-containing compound may comprise a tertiary amine, and at least one selected from inorganic acids, organic acids, and quaternary compound-forming agents.

Specific examples of the tertiary amine may include: N-methyl diethanolamine, N-ethyl diethanolamine, or N-alkyl diethanolamine having an alkyl chain with a carbon number of two or more, N-phenyl diethanolamine, -phenyl dipropanolamine, N-methyl diisopropanolamine, N,N'-dihydroxyethyl propanolamine, triethanolamine, N,N'-dimethyl ethanolamine, N-methyl-bis-(3- aminopropyl)-amine, N-methyl-bis-(2-aminopropyl)-amine, etc.

Specific examples of the above inorganic or organic acid may include: hydrochloric acid, acetic acid, lactic acid, cyanoacetic acid, phosphoric acid, sulfuric acid, etc. Specific examples of the quaternary compound-forming agent may include: dimethyl sulfate, benzyl chloride, bromoacetamide, chloroacetamide or alkyl halides such as ethyl bromide, propyl bromide, and butyl bromide. Further, specific examples of another cationic hydrophilic polar group-containing compound may include: cationic compounds such as primary amine salts, secondary amine salts, tertiary amine salts, pyridinium salts, etc.

As the above quaternary compound-forming agent, it is also possible to use an amphoteric compound such as a reaction product of tertiary amine-containing polyol and sulfo betaine.

The hydrophilic surfactant has a hydrophilic group in the molecular skeleton thereof, and has an effect of imparting a water-dispersibility to the blocked isocyanate according to the present invention. In view of the reactivity and stability of the isocyanate group in the water-dispersible blocked isocyanate, the hydrophilic surfactant may preferably be nonionic.

(Hydrophobic organic compound having carbon number of seven or more)

Specific examples of the "hydrophobic organic compound having a carbon number of seven or more and having at least one active hydrogen group" which may be introduced into the water-dispersible blocked isocyanate composition according to the present invention as desired, may include: higher alcohols having a carbon number of seven or more, such as heptyl alcohol, benzyl alcohol, octyl alcohol, 2-ethyl-hexanol, methyl benzyl alcohol, capryl alcohol, nonyl alcohol, decyl alcohol, undecyl alcohol, lauryl alcohol, tridecyl alcohol, myristyl alcohol, pentadecyl alcohol, cetyl alcohol, and cinnamyl alcohol; monoamines having a carbon number of seven or more, such as heptyl amine, octyl amine, benzylamine, 2-ethyl-hexylamine, methyl benzylamine, capryl amine, nonyl amine, decyl amine, undecyl amine, lauryl amine, tridecyl amine, myristyl amine, pentadecyl amine, cetyl amine, cinnamyl amine, - methyl heptyl amine, N-methyloctyl amine, and N-methyl benzylamine; hydroxyl group-containing esters which have a total carbon number of seven or more, and comprise a hydroxy-carboxylic acid, such as α-hydroxypropionic acid, hydroxysuccinic acid, dihydroxysuccinic acid, ε-hydroxypropane-1,2,3-tricarboxylic acid, hydroxyacetic acid, α-hydroxy butyric acid, hydroxy stearic acid, recinoleic acid, recino-elaidic acid, recino-stearolic acid, salicylic acid, and mandelic acid, and a mono alcohol such as methanol, ethanol, propanol, isopropanol, butanol, sec-butanol, and ter-butanol; polymer polyols which have been exemplified in the above description relating to "organic acids, or polymer polyols (polyester polyol, polyether polyol, polycarbonate polyol), polyolefin polyol"; etc.

The above-mentioned hydrophobic organic compound has a hydrocarbon chain in the molecular skeleton thereof, and the water-dispersible blocked isocyanate into which the hydrophoic organic compound has been introduced, may have an improved compatibility with the molecular skeleton of a water-soluble polymer contained in an aqueous solution and/or aqueous emulsion, whereby the gloss and definition in a case where the isocyanate is converted into a paint film as a water-base paint, etc. Accordingly, it is more effective that the "hydrocarbon chain" contained in this hydrophobic organic compound has a certain degree of bulkiness or dimension. More specifically, such a hydrocarbon chain may preferably have a carbon number of 7 or more, more preferably 12 or more.

Further, the site or position of the "active hydrogen group" of the hydrophobic organic compound to be reacted with an isocyanate group may preferably be at the center or in the neighborhood thereof of the hydrophobic organic compound, rather than at the and portion of the hydrophobic organic compound. According to the persent inventor's knowledge, it is presumed that the reason fot the above prefernce is that, in a case where water is present in a system after the release of the blocking agent, the peformance for protecting the isocyanate group from the attack of the water is futher improved on the basis of a steric hindrance-like effect.

(Content of low-molecular glycol, etc.)

In the present invention, the amount (X) of the low-molecular glycol to be contained or to be introduced may preferably be one satisfying a relationship of 0.1 wt. %≦X≦15 wt. %, more preferably 0.3 wt. %≦X≦10 wt. %, particularly preferably 0.5 wt. %≦X≦5 wt. %, based on the isocyanate group-terminated precursor.

When the amount (X) of the low-molecular glycol to be introduced is below 0.1 wt. %, there is a tendency to easily cause a problem of poor compatibility with a water-soluble polymer solution or aqueous emulsion, or a tendency to easily cause a problem of providing a partially gelatinized (or gel-forming) product at the time of the synthesis of the blocked isocyanate. On the other hand, when the amount (X) of the low-molecular glycol to be introduced exceeds 15 wt. %, there is a tendency such that the isocyanurate structure in the blocked isocyanate cannot fully exhibit its characteristic, and the resultant improvement in the weather resistance and heat resistance is liable to be insufficient.

The amount (Y) of the hydrophilic surfactant to be contained or to be introduced may preferably be one satisfying a relationship of 0.1 wt. %≦Y≦50 wt. %, more preferably 0.5 wt. %≦Y≦45 wt. %, particularly preferably 1 wt. % ≦Y≦40 wt. %, based on the isocyanate group-terminated precursor. When the amount (Y) of the hydrophilic surfactant to be introduced is below 0.1 wt. %, there is a tendency such that the dispersion stability with respect to the water-soluble polymer solution or aqueous emulsion becomes worse, and a phenomenon such as precipitation is liable to occur. On the other hand, when the amount (Y) of the hydrophilic surfactant to be introduced exceeds 50 wt. %, there is a tendency such that the isocyanurate structure in the blocked isocyanate cannot fully exhibit its characteristic, and the resultant improvement in the weather resistance and heat resistance is liable to be insufficient.

When the hydrophobic compound is introduced, the compatibility with the water-base resin may be improved, but the effective NCO will be decreased in accordance with the increase in such an introduction. Therefore, it is preferred to determine the above introduction amount in consideration of these factors.

The amount (Z) of the hydrophobic organic compound to be contained in or introduced into the isocyanate group-terminated precursor may preferably be one satisfying a relationship of 0 wt. %<Z≦30 wt. %, more preferably 0 wt. %<Z≦25 wt. %, particularly preferably 0 wt. %<Z≦20 wt. %, based on the isocyanate group-terminated precursor. When the amount (Z) of the hydrophobic organic compound to be introduced exceeds 30 wt. %, there is a tendency such that the isocyanurate structure in the blocked isocyanate cannot fully exhibit its characteristic, and the resultant improvement in the weather resistance and heat resistance is liable to be insufficient.

Thus, in the water-dispersible blocked isocyanate according to the present invention, a hydrophilic surfactant is introduced into an organic isocyanate, and further a low-molecular glycol (and optionally, a hydrophobic organic compound comprising an aliphatic compound or fatty acid ester, etc., as desired) is introduced thereinto in a well-balanced manner, thereby to obtain a water-dispersible blocked isocyanate which not only has a dispersion stability but also has a compatibility with the molecular skeleton of a water-soluble polymer solution or an aqueous emulsion.

The water-dispersible blocked isocyanate according to the present invention may preferably have a (mean or average) number (f) of functional group(s) of 2.0–4.2, more preferably 2.2–4.0. When the functional group number (f) is below 2.0, the resultant crosslinking efficiency tends to become lower. On the other hand, when the functional group number (f) exceeds 4.2, the number of functional group becomes too large, and there is strengthen a tendency such that intramolecular crosslinking is liable to occur rather than intermolecular crosslinking between molecules of the resin constituting a main component. As a result, the resultant crosslinking efficiency also tends to become lower.

The above functional group number (f) may preferably be measured in the following manner.

(1) A blocked isocyanate composition is heated in an atmosphere of an inert gas, to remove the blocking agent, the solvent, etc.

(2) The NCO content of the remaining polyisocyanate is measured.

(3) The number-average molecular weight of the remaining polyisocyanate is measured by means of gel permeation chromatography (GPC) using a calibration curve which has been obtained by using polystyrene standard samples.

(4) The mean functional group number (f) is calculated by applying the thus obtained NCO content value and the number-average molecular weight to the following equation.

$$f = NCO \text{ (wt. \%)}/42 \times 1/100 \times Mn = NCO \text{ (wt. \%)} \times Mn/4200$$

f: mean functional group number (i.e., a value obtained by dividing number-average molecular weight of precursor by number-average molecular weight per one NCO group)

NCO: measured value of NCO content (wt. %)

Mn: measured value of number-average molecular weight

100×42/NCO: number-average molecular weight per one NCO group (Process for producing isocyanate group-terminated precursor)

In the present invention, for example, the following method may be used as the process for producing an isocyanate group-terminated precursor.

(A) A method wherein a low-molecular glycol is addition-reacted with an organic isocyanate to form an isocyanate group-terminated prepolymer, and then an isocyanurate-forming catalyst is added to the resultant isocyanate group-terminated prepolymer to introduce thereinto an isocyanurate ring structure, and thereafter a hydrophilic surfactant (and optionally a hydrophobic organic compound, as desired) is reacted with the resultant product.

(B) A method wherein a low-molecular glycol is addition-reacted with an organic isocyanate, and simultaneously an isocyanurate-forming catalyst is added thereto to introduce thereinto an isocyanurate ring structure, and thereafter a hydrophilic surfactant (and optionally a hydrophobic organic compound, as desired) is reacted with the resultant product.

(C) A method wherein a low-molecular glycol and a hydrophilic surfactant (and optionally a hydrophobic organic compound, as desired) are reacted with an organic isocyanate, and thereafter an isocyanurate-forming catalyst is added thereto to introduce thereinto an isocyanurate ring structure.

(D) A method wherein a low-molecular glycol and a hydrophilic surfactant (and optionally a hydrophobic organic compound, as desired) are reacted with an organic isocyanate, and simultaneously an isocyanurate-forming catalyst is added thereto to introduce thereinto an isocyanurate ring structure.

However, in a case where a relatively low viscosity of the water-dispersible blocked isocyanate is preferred, e.g., in a case where the water-soluble polymer solution and/or aqueous emulsion to be combined has a low viscosity, and an adverse effect is provided on the workability if the self-emulsifiable blocked polyisocyanate has a high viscosity to provide a poor dispersibility, etc., it is preferred to adopt the above method (C) wherein all the active hydrogen compounds to be used are reacted with the organic isocyanate, and thereafter an isocyanurate ring structure is introduced thereinto so that the viscosity of water-dispersible blocked isocyanate desirably becomes low.

The reaction of the isocyanate group with the low-molecular glycol, and the reaction of the isocyanate group with the hydrophilic surfactant or the hydrophobic organic compound can be conducted under a condition for usual urethane-forming reaction. The reaction temperature may suitably be in the range of 20–150° C.

The isocyanurate-forming reaction may for example be conducted in the following manner. Thus, an isocyanurate-forming catalyst comprising a tertiary amine, alkyl-substituted ethyleneimine, a tertiary alkyl phosphine, an acetylacetone metal salt, a metal salt of an organic acid, etc., is used singly or as a combination of two or more species thereof, and as desired, a co-catalyst comprising a phenolic hydroxyl group-containing compound, an alcoholic hydroxyl group-containing compound, etc., is used. In general, the isocyanurate-forming reaction may be conducted at a reaction temperature of 0–90° C., in the absence of a solvent, or in the presence of an inert solvent which has commonly been used in the polyurethane industry, including: aromatic-type solvents such as toluene and xylene; ketone-type solvents such as methyl ethyl ketone and methyl isobutyl ketone; ester-type solvents such as ethyl acetate and butyl acetate; glycol ether ester-type solvents such as propylene glycol methyl ether acetate, diethylene glycol butyl ether acetate, and ethyl-3-ethoxy propionate; or, as desired, in a polyol or plasticizer such as DOP (dioctyl phthalate) which assumes a liquid state at a reaction temperature.

After the above isocyanurate-forming reaction , the above-mentioned catalyst is deactivated to stop the reaction by using a reaction-stopping agent such as phosphoric acid, para-toluenesulfonic acid methyl ester, and sulfur.

(Blocking agent)

The blocking agent to be used for the present invention is not particularly limited, but may appropriately be used as one or more kinds selected from those known in the art. Specific examples of the blocking agent may include: phenol-type compounds, alcohol-type compounds, active methylene-type compounds, mercaptan-type compounds, acid amide-type compounds, lactam-type compounds, acid imide-type compounds, imidazole-type compounds, urea-type compounds, oxime-type compounds, amine -type compounds, etc.

More specific examples of the above blocking agent may include: phenol-type compounds such as phenol, creosol, ethyl phenol, and butyl phenol; alcohol-type compounds such as 2-hydroxy pyridine, butyl cellosolve, propylene glycol monomethyl ether, ethylene glycol, benzyl alcohol, methanol, ethanol, n-butanol, isobutanol, and 2-ethyl hexanol; active methylene-type compounds such as dimethyl malonate, diethyl malonate, methyl acetoacetate, ethyl acetoacetate, and acetylacetone; mercaptan-type compounds such as butyl mercaptan, and dodecyl mercaptan; acid amide-type compounds such as acetanilide, and acetic acid amide; lactam-type compounds such as $\epsilon$-caprolactam, $\delta$-valerolactam and $\gamma$-butyrolactam; imide-type compounds such as succinic acid imide, and maleic acid imide; imidazole-type compounds such as imidazole and 2-methyl imidazole; urea-type compounds such as urea, thiourea, and ethylene urea; oxime-type compounds such as formaldoxime, acetaldoxime, acetone oxime, methyl ethyl keto oxime, methyl isobutyl keto oxime, and cyclohexanone oxime; amine-type compounds such as diphenyl aniline, aniline, carbazole, ethyleneimine, and polyethylene imine; etc.

Among the above blocking agents, in view of versatility, easiness in preparation, and workability, methyl ethyl keto oxime, ε-caprolactam, and 2-ethyl hexanol may particularly preferably be used.

(Reaction of blocking agent with precursor)

The water-dispersible blocked isocyanate composition according to the present invention may for example be obtained by reacting the above-mentioned isocyanate group-terminated precursor with the blocking agent (blocking reaction). Such a reaction of the blocking agent with the isocyanate group-terminated precursor may be conducted according to ordinary blocking reaction conditions (e.g., at a temperature of 20–200° C.).

In view of the promotion of the blocking reaction, the molar amount of the blocking agent to be subjected to the reaction may preferably be 1.0–1.5 times the molar amount of free isocyanate group. The blocking reaction may be conducted regardless of the presence of a solvent. However, it is also possible to use an inert solvent, a catalyst, etc., which are known or have ordinarily been used in the urethane industry, as desired.

As described above, the blocking agent may also be subjected to a reaction simultaneously with the hydrophilic surfactant and hydrophobic organic compound (as components constituting the isocyanate group-terminated precursor). Alternatively, it is also possible that the blocking agent is reacted with the isocyanate group-terminated prepolymer, and thereafter the hydrophilic surfactant and hydrophobic organic compound are introduced thereinto.

It is also possible to add to the water-dispersible blocked isocyanate composition according to the present invention, any of known additives such as colorant or pigment, dispersion stabilizer, viscosity modifier, leveling agent, anti-gel forming agent, light stabilizer, antioxidant, ultraviolet absorber, heat resistance improver, inorganic or organic filler, plasticizer, lubricant, antistatic agent, reinforcing material, and catalyst.

(Water-base resin)

Specific examples of the water-base resin to be usable in combination with the water-dispersible blocked isocyanate composition according to the present invention may include: a solution of a water-soluble polymer, an aqueous suspension, aqueous emulsion, or aqueous dispersion which may be prepared by dispersing a water-dispersible polymer, etc., in water. In consideration of the reactivity with an isocyanate group, preferred type of the water-base resin may include an aqueous solution of the water-soluble polymer wherein the dispersoid (solute) assumes a liquid state, an aqueous emulsion or aqueous dispersion which has been obtained by dispersing a water-dispersible polymer in water.

The above-mentioned "solution", "dispersion", "emulsion", and "suspension" respectively refer to the following conditions.

Solution: a mixture wherein a solute is completely dissolved in a solvent.

Dispersion: a mixture wherein a solute is not dissolved in a solvent, but is dispersed therein. In the dispersion, the dispersoid has an average particle (or droplet) size of about 0.001–0.1 µm and is liquid.

Emulsion: a mixture wherein a solute is not dissolved in a solvent, but is dispersed therein. In the emulsion, the dispersoid has an average particle (or droplet) size of about 0.1 µm or more and is liquid.

Suspension: a mixture wherein a solute is not dissolved in a solvent, but is dispersed therein. In the suspension, the dispersoid is solid.

(Water-soluble polymer)

The polymer constituting the water-soluble polymer solution to be usable in combination with the water-dispersible block isocyanate composition according to the present invention is not particularly limited, but may appropriately be one or more species thereof which are selected from known water-soluble polymers.

In view of versatility, as the above water-soluble polymer, it is preferred to use polyvinyl alcohol, water-soluble ethylene-vinyl acetate copolymer, polyethylene oxide, water-soluble acrylic resin, water-soluble epoxy resin, water-soluble cellulose derivative, water-soluble polyester, and water-soluble lignin derivative, etc.

(Aqueous emulsion)

The aqueous emulsion usable for the present invention may appropriately be used without particular limitation while selecting one or more species thereof selected from aqueous emulsions known in the art (for example, those represented by so-called "latex" or "emulsion").

Specific examples of the aqueous emulsion may include: rubber-type latexes such as styrene-butadiene copolymer latex, acrylonitrile-butadiene copolymer latex, methyl methacrylate-butadiene copolymer latex, chloroprene latex, and polybutadiene latex; polyacrylic acid ester latex, polyvinylidene chloride latex, polybutadiene latex, or those obtained by converting these latexes into carboxyl-modified derivatives, etc. It is also possible to use emulsions such as polyvinyl chloride emulsion, urethane-acrylic emulsion, silicon-acrylic emulsion, vinyl acetate-acrylic emulsion, urethane emulsion, and acrylic emulsion.

A fluorine (resin) emulsion having excellent weather resistance and contamination resistance is a non-crosslinked resin and has a poor solvent resistance when such a resin is used alone. However, when this type of resin is used in combination with the water-dispersible blocked isocyanate according to the present invention, it will have not only further improved weather resistance and contamination resistance, but also improved solvent resistance.

(Aqueous dispersion and aqueous suspension)

In addition, in the present invention, it is also possible to use those known in the art which are called as "aqueous dispersion" or "aqueous suspension", as long as they have an active hydrogen group.

In the water-base paint composition, water-base adhesive composition according to the present invention, in view of properties such as weather resistance, the ratio of the moles of the isocyanate groups blocked with a blocking agent in the water-dispersible blocked isocyanate composition, and moles of active hydrogen groups in the solid content of the water-base resin may preferably be (mole of isocyanate group):(mole of active hydrogen group)=1:9 to 9:1, more preferably 4:6 to 6:4.

The water-dispersible blocked isocyanate composition may directly be add to a main component (water-base resin), or may be added to the main component in a manner such that the water-dispersible blocked isocyanate composition is once dispersed in water, or is diluted with a solvent which has been ordinarily been used in the urethane industry, as desired, and then added to the main component.

The water-base paint composition and water-base adhesive composition according to the present invention is usable in very wide applications thereof. Specific examples of such an application may include: e.g., paint or adhesive for metal, woodwork, plastic, fiber, wood material, paper, porous inorganic material, etc.

(Viscosity)

In view of workability, the water-dispersible blocked isocyanate composition according to the present invention may preferably show a viscosity range of 100 to 100,000 mPa.s/25° C., more preferably 150 to 80,000 mPa.s/25° C., particularly preferably 200 to 50,000 mPa.s/25° C., in the state of a solution in an organic solvent having a solid content of 80%.

The above viscosity may preferably be measured in the following measuring method.

<Method of measuring viscosity>

The measurement is conducted by using a rotary viscometer by a method according to JIS (Japanese Industrial Standard) K5400 -1990. The outline of the measuring method is as follows.

Thus, a sample of which viscosity is to be measured is prepared so that the temperature thereof is regulated to 25° C., is poured into a beaker of about 500 ml (having an inside diameter of about 85 mm, and a depth of about 120 mm) so as to provide a depth of the sample of 100 mm or more. Then, the viscosity of the sample in the beaker is measured by using a single cylinder-type rotary viscometer (SB-type viscometer, e.g., trade name: Digital Viscometer DVL-B II, mfd. By Tokimec Co.). The type or size of the rotor to be selected and torque or rotation speed may be determined in accordance with the above-mentioned JIS K5400-1990. At this time, the scale indication θ, i.e., a location at which the pointer of the rotary viscometer becomes stationary at a certain location of the rotating scale plate (the location of the pointer may preferably be at a location corresponding to about 20–100%, in order to reduce the error) is read out, and the viscosity η (mPa.s {cP}) is calculated in accordance with the following equation by using a conversion multiplier K prescribed in JIS K5400-1990 (Table 10), which is determined on the basis of the type or number of the rotor and rotation speed of the rotor.

$$\eta = k \times \theta$$

(Effective NCO content)

In view of properties such as weather resistance, the water-dispersible blocked isocyanate composition according to the present invention may preferably show an effective NCO content in the range of 4.0–15.0 wt. %, more preferably 4.5–14.5 wt. %, particularly preferably 5.0–14.0 wt. %, in the state of a solution in an organic solvent having a solid content of 80%. This effective NCO content indicates the content of all the NCO groups inclusive of the NCO groups form which the blocking groups are to be removed under predetermined heating.

The effective NCO content may preferably be measured in the following measuring method.

<Method of measuring effective NCO content>

(1) About 1.0–2.0 g of a sample of which effective NCO content is to be measured is precisely weighed in an Erlenmeyer flask having a "fitting"-type opening (having an inner volume of 300 ml).

(2) 25 ml of 0.5 mol/l of dibutylamine-monochlorobenzene solution is added to the above Erlenmeyer flask, and a solvent and zeolite is added therein, and thereafter a "fitting"-type Allihn condenser is mounted to the opening of the flask. At this time, the following solvent is used as the above "solvent".

<Selection of solvent>

In the case of a blocking agent comprising MEK (methyl ethyl ketone) oxime: xylene In the case of a blocking agent comprising ε-caprolactam: ortho-dichlorobenzene In the case of a blocking agent comprising 1-octanol: ethoxybutyl acetate (3) The above Erlenmeyer flask is placed on a hot plate which has been prepared in advance, and is subjected to a reaction for 30 minutes after the solvent in the flask begins to boil.

(4) Then, the Erlenmeyer flask is detached from the hot plate, and is cooled to room temperature. Thereafter, 20–30 ml of methanol is poured thereinto from the top of the fitting-type Allihn condenser so as to wash the inner wall portion of the condenser with the methanol.

(5) The above condenser is detached from the Erlenmeyer flask, and thereafter 100 ml of methanol and one drop of bromophenol blue indicator are added into the Erlenmeyer flask. Then, the content of the flask is subjected to back titration by using a hydrochloric acid standard solution of 0.5 mol/l. At this time, the amount of the hydrochloric acid standard solution required for the above sample titration is represented by A (ml).

(6) The above steps (1)~(4) are repeated in the same manner as described above except that heating is not conducted, thereby to obtain a "blank" sample. The resultant blank is subjected to a titration procedure in the same manner as described in the above step (5). At this time, the amount of the hydrochloric acid standard solution required for the above sample titration is represented by B (ml).

(7) In the above titration, the point at which the color of the bromophenol blue indicator is changed from indigo (blue) into yellow is treated as the end point of the titration.

(8) The effective NCO content is calculated by using the following equation.

Effective NCO content (wt. %)={(B−A)×42×0.5×f}×100÷(S× 1000)

In the above equation, the respective symbols have the following meanings:

A: amount (ml) of the hydrochloric acid standard solution of 0.5 mol/l required for the titration of the sample;

B: amount (ml) of the hydrochloric acid standard solution of 0.5 mol/l required for the titration of the blank;

f: factor of the hydrochloric acid standard solution of 0.5 mol/l; and

S: amount (g) of the sample.

(Dispersion stability)

In view of the paint film appearance and workability, the water-dispersible blocked isocyanate composition according to the present invention may preferably show a certain dispersion stability such that when the isocyanate is dispersed in water and the resultant mixture is left standing for 30 minutes, and then the appearance of the mixture is observed by the naked eyes, the observed appearance is uniform without producing precipitate. <Method for measuring dispersion stability>

(1) A sample of the water-dispersible blocked isocyanate composition of which dispersion stability is to be measured, and distilled water having the same weight of the isocyanate sample are placed in the same vessel (a flask made of glass).

(2) The resultant content in the above flask is rapidly stirred by using a stirrer under a condition of 100 rpm×60 seconds, thereby to disperse the isocyanate in water.

(3) After the above-mentioned stirring is finished, the resultant mixture is left standing for 30 minutes. Then, the appearance of the resultant dispersion liquid is observed by the naked eye to confirm the dispersion state thereof.

(4) When no precipitate is found in the dispersion liquid, and the dispersion liquid assumes a uniform or homogeneous solution or dispersion on the basis of the above naked eye observation, the dispersion liquid is considered to have a "dispersion stability".

(Gloss)

In view of the resultant paint film appearance, the water-dispersible blocked isocyanate composition according to the present invention may preferably provide a gloss in the range of 60–100, more preferably 65–100, particularly preferably 70–100, in terms of gloss under conditions of an angle of incidence of 60° and an angle of reflection of 60°.

The above gloss may preferably be measured after the isocyanate according to the present invention is converted into a paint for gloss measurement in the following manner.

(Method for measuring gloss)

(1) A paint to be used for gloss measurement is prepared from the following raw materials by using the blocked isocyanate composition according to the present invention (of which gloss is to be evaluated) as a curing (or hardening) agent.

Main component: trade name: ALMATEX WA911 (mfd. by Mitsui Toatsu Kagaku K.K.); solid content=60 wt. %, acid number=29 mg KOH/g Curing agent: blocked isocyanate composition according to the present invention, etc.

Pigment: titanium oxide (trade name: Tipaque R-970, mfd. by Ishihara Sangyo Co.)

Neutralizing agent: tertiary amine (triethylamine, mfd. by Kishida Chemical Co., first-grade (or extra pure) reagent)

Diluent: Water (2) The amount of the respective components to be formed into the above formulation are calculated in the following manner.

The number of parts (weight parts) of a main component (solution) is represented by "A".

Pigment 0.7×A

Curing agent (parts, in terms of solid content)=1.1×A/{effective NCO (wt. %)}

Neutralizing agent(parts)=A×{acid number (mg KOH/g) of main component}/(molecular weight of neutralizing agent)/56

Water (parts)=1.2×A—{neutralizing agent (parts)}

(3) The resultant paint which has been prepared so as to provide the above-mentioned formulation is applied onto an aluminum plate (trade name: A1050P, mfd. by Nippon Test Panel Industry Co.) by using a bar-coater so as to provide a paint film thickness of 30–40 μm after drying, and is then heat-treated. At this time, the heating condition may be changed in accordance with the kind of the blocking agent (With respect to specific examples of the heating condition, the description of "Examples" appearing hereinafter may be referred to). The gloss of the thus obtained paint film is measured by using a gloss measuring apparatus (trade name: Pico-Grossmaster, Model 500, mfd. by Elichsen Co.) under the conditions of an angle of incidence of 60° and an angle of reflection of 60°.

EXAMPLES

Hereinbelow, the present invention will be described in further detail by referring Examples and Comparative Examples, but the present invention is not limited to the Examples. Further, the "part(s)" and "%" appearing in the following Examples mean "weight part(s)" and "weight %", respectively, unless otherwise noted specifically.

Synthesis Example 1

(Synthesis of isocyanate group-terminated precursor)

300 parts of HDI (hexamethylene-1,6-diisocyanate) and 2.8 parts of 1,3-butanediol were poured into a reactor vessel (made of glass, having an inner volume of 500 ml (milliliter)) equipped with a stirrer, a thermometer, a nitrogen sealing tube, and a condenser. The atmosphere in the inside of the reactor vessel was replaced with nitrogen gas, and then the reactor vessel was heated up to a reaction temperature of 80° C. under stirring, and was subjected to a reaction at the same temperature for two hours.

When the isocyanate group content of the thus obtained reaction liquid mixture was measured, it was found to be 48.6 %. Then, 0.06 parts of capric acid potassium salt as a catalyst, and 0.3 parts of phenol as a cocatalyst were added to the reaction mixture, and the resultant mixture was subjected to an isocyanurate-forming reaction at 60° C. for six hours. 0.042 parts of phosphoric acid as a stop agent was added to this reaction mixture liquid and the resultant mixture was stirred for one hour at the reaction temperature, and then the free HDI was removed by thin-film distillation under the conditions of 120° C. and 0.01 Torr to provide a product substantially free of monomeric organic isocyanate, namely a free HDI content of only 0.3%. The thus obtained isocyanate group-terminated precursor was a transparent liquid having a color of light yellow (or lemon yellow), an isocyanate group content of 20.8%, a viscosity of 2500 cP/25° C., a functional group number of 3.8, and a low-molecular glycol content of 2.6%. Further, in this precursor, the presence of an isocyanate group, an isocyanurate group and a urethane group was confirmed by using an FT-IR (Fourier-transform infrared spectrometer) (trade name: FT-IR 1600 Series, mfd. by Perkin-Elmer Co.) and $^{13}$C-NMR (trade name: FT-NMR Unity-500, mfd. by Varian Co.). The yield was 35%.

Synthesis Example 2

300 parts of HDI and 4.0 parts of 2-n-butyl-2-ethyl-1,3-propanediol were poured into a reactor vessel which was the same as that used in Synthesis Example 1. The atmosphere in the inside of the reactor vessel was replaced with nitrogen gas, and then the reactor vessel was heated up to a reaction temperature of 80° C. under stirring, and was subjected to a reaction at the same temperature for two hours. When the isocyanate group content of the resultant reaction liquid mixture was measured, it was found to be 48.6%.

Then, 0.06 parts of capric acid potassium salt as a catalyst, and 0.3 parts of phenol as a cocatalyst were added to the reaction mixture, and the resultant mixture was subjected to an isocyanurate-forming reaction at 60° C. for 4.5 hours. 0.042 parts of phosphoric acid as a stop agent was added to this reaction mixture liquid and the resultant mixture was stirred for one hour at the reaction temperature (80° C.), and then the free HDI was removed by thin-film distillation under the conditions of 120° C. and a pressure of 0.01 Torr to provide a product substantially free of monomeric organic isocyanate, namely a free HDI content of only 0.5%.

The thus obtained isocyanate group-terminated precursor was a transparent liquid having a color of light yellow, an isocyanate group content 21.3%, a viscosity of 2600 cP/25° C., a functional group number of 3.6, and a low-molecular glycol content of 5.3%. Further, in this precursor, the presence of an isocyanate group, an isocyanurate group and a urethane group was confirmed by using an FT-IR and $^{13}$C-NMR. The yield was 25%.

Synthesis Example 3

300 parts of HDI and 0.7 parts of neopentyl glycol were poured into a reactor vessel which was the same as that used in Synthesis Example 1. The atmosphere in the inside of the reactor vessel was replaced with nitrogen gas, and then the reactor vessel was heated up to a reaction temperature of 80° C. under stirring, and was subjected to a reaction at the same temperature for two hours. When the isocyanate group content of the resultant reaction liquid mixture was measured, it was found to be 49.6%.

Then, 0.06 parts of capric acid potassium salt as a catalyst, and 0.3 parts of phenol as a cocatalyst were added to the reaction mixture, and the resultant mixture was subjected to an isocyanurate-forming reaction at 60° C. for 4.5 hours. 0.042 parts of phosphoric acid as a stop agent was added to this reaction mixture liquid and the resultant mixture was further stirred for one hour at the reaction temperature (80° C.), and then the free HDI was removed by thin-film distillation under the conditions of 120° C. and 0.01 Torr to provide a product substantially free of monomeric organic isocyanate, namely a free HDI content of only 0.4%.

The thus obtained isocyanate group-terminated precursor was a transparent liquid having a color of light yellow, an isocyanate group content of 21.2%, a viscosity of 2300 cP/25° C., a functional group number of 3.8, and a low-molecular glycol content of 0.8%. Further, in this precursor, the presence of an isocyanate group, an isocyanurate group and a urethane group was confirmed by using an FT-IR and $^{13}$C-NMR. The yield was 30%.

Synthesis Example 4

300 parts of HDI, 3.9 parts of 2,2,4-trimethyl-1,3-pentanediol, and 16 parts of polyhydroxyethylene methyl ether (hydroxyl value: 140 mg KOH/g, mfd. by Toho Chiba Kogyo Co., hereinafter abbreviated as "methoxy PEG # 400") were poured into a reactor vessel which was the same as that used in Synthesis Example 1. The atmosphere in the inside of the reactor vessel was replaced with nitrogen gas, and then the reactor vessel was heated up to a reaction temperature of 80° C. under stirring, and was subjected to a reaction at the same temperature for two hours. When the isocyanate group content of the resultant reaction liquid mixture was measured, it was found to be 45.6%.

Then, 0.06 parts of capric acid potassium salt as a catalyst, and 0.3 parts of phenol as a cocatalyst were added to the reaction mixture, and the resultant mixture was subjected to an isocyanurate-forming reaction at 60° C. for 4.5 hours. 0.042 parts of phosphoric acid as a stop agent was added to this reaction mixture liquid and the resultant mixture was further stirred for one hour at the reaction temperature (80° C.), and then the free HDI was removed by thin-film distillation under the conditions of 120° C and 0.01 Torr to provide a product substantially free of monomeric organic isocyanate, namely a free HDI content of only 0.4%.

The thus obtained isocyanate group-terminated precursor was a transparent liquid having a color of light yellow, an isocyanate group content of 17.2%, a viscosity of 730 cP/25° C., a functional group number of 3.4, a low-molecular glycol content of 3.0%, and a hydrophilic surfactant content of 12.4%. Further, in this precursor, the presence of an isocyanate group, an isocyanurate group and a urethane group was confirmed by using an FT-IR and $^{13}$C-NMR. The yield was 40%.

Example 1
(Synthesis of water-dispersible blocked isocyanate)

100 parts of the isocyanate group-terminated precursor which had been obtained in Synthesis Example 1, and 16 parts of "methoxy PEG # 400" were poured into a reactor vessel which was the same as that used in Synthesis Example 1, and the resultant mixture was heated up to 75° C., and was subjected to a reaction for three hours while retaining the same temperature (75° C.), thereby to obtain an isocyanate group-terminated precursor having an NCO content of 16.5%, a viscosity of 2730 cP/25° C., a functional group number of 3.5, a content of low molecular glycol of 2.2%, and a hydrophilic surfactant content of 13.7%.

100 parts of the resultant isocyanate group-terminated precursor was mixed with 33.7 parts of methyl ethyl ketone (hereinafter, abbreviated as "MEK") at room temperature. Further, 34.9 parts of methyl ethyl ketooxime was placed in a dripping (or dropping) funnel, and was dropped to the above isocyanate group-terminated precursor/MEK mixture under stirring so as to provide a dropping period of time of 30 minutes, and further the resultant mixture was subjected to a reaction at 70° C. for two hours, thereby to obtain a water-dispersible blocked isocyanate (WBI-1) having a transparent light yellow color, an effective NCO content of 9.8%, a viscosity of 650 cP/25° C., and a solid content 80%.

Example 2

100 parts of the isocyanate group-terminated precursor which had been obtained in Synthesis Example 1, 12 parts of methoxy PEG # 400, and 4 parts of ricinoleic acid methyl ester (having a hydroxyl value of 166, mfd. by Ogura Kogyo Co., hereinafter, abbreviated as "K-PON 180") were poured into a reactor vessel which was the same as that used in Synthesis Example 1, and the resultant mixture was heated up to 75° C., and was subjected to a reaction for three hours while retaining the same temperature (75° C.), thereby to obtain an isocyanate group-terminated prepolymer having an NCO content of 16.4%, a viscosity of 2920 cP/25° C., a functional group number of 3.5, a low-molecular glycol content of 2.2%, a hydrophilic surfactant content of 10.3%, and an aliphatic compound content of 3.4%.

100 parts of the resultant isocyanate group-terminated prepolymer was mixed with 33.7 parts of MEK at room temperature. Further, 34.7 parts of methyl ethyl ketooxime was dropped from a dripping funnel to the thus obtained mixture so as to provide a dropping period of time of 30 minutes, and further the resultant mixture was subjected to a reaction at 70° C. for two hours, thereby to obtain a water-dispersible blocked isocyanate (WBI-2) having a transparent light yellow color, an effective NCO content of 9.7%, a viscosity of 670 cP/25° C., and a solid content 80%.

Example 3

100 parts of the isocyanate group-terminated precursor which had been obtained in Synthesis Example 1, 20 parts of methoxy PEG # 400, and 18 parts of "K-PON 180" were poured into a reactor vessel which was the same as that used in Synthesis Example 1, and the resultant mixture was heated up to 75° C., and was subjected to a reaction for three hours while retaining the same temperature (75° C.), thereby to obtain an isocyanate group-terminated prepolymer having an NCO content of 11.9%, a viscosity of 3050 cP/25° C., a functional group number of 3.0, a low-molecular glycol content of 1.9%, and an aliphatic compound content of 13.0%.

100 parts of the resultant isocyanate group-terminated prepolymer was mixed with 33.7 parts of MEK and 33.7 parts of ε-caprolactam, and the resultant mixture was heated up to 70° C. under mixing and stirring. The resultant mixture was subjected to a reaction at 70° C. for three hours, and thereafter 0.01 part of dibutyltin laurate (hereinafter, abbreviated as "DBTDL") was added to the resultant mixture and subjected to a reaction at 70° C. for ten hours, thereby to obtain a water-dispersible blocked isocyanate (WBI-3) having a transparent light yellow color, an effective NCO content of 7.1%, a viscosity of 1,000 cP/25° C., and a solid content 80%.

Example 4

100 parts of the isocyanate group-terminated precursor which had been obtained in Synthesis Example 1, 24 parts of methoxy PEG # 400, and 21.6 parts of K-PON 180 were poured into a reactor vessel which was the same as that used in Synthesis Example 1, and the resultant mixture was heated up to 75° C., and was subjected to a reaction for three hours while retaining the same temperature (75° C.), thereby to obtain an isocyanate group-terminated prepolymer having an NCO content of 10.7%, a viscosity of 3500 cP/25° C.; a functional group number of 2.8, a low-molecular glycol content of 1.8%, a hydrophilic surfactant content of 16.5%, and an aliphatic compound content of 14.8%.

100 parts of the resultant isocyanate group-terminated prepolymer was mixed with 32.6 parts of MEK and 30.3 parts of ε-caprolactam, and the resultant mixture was heated up to 70° C. under mixing and stirring. The resultant mixture was subjected to a reaction at the same temperature (70° C.) for three hours, and thereafter 0.01 part of DBTDL was added to the resultant mixture and subjected to a reaction at 70° C. for ten hours, thereby to obtain a water-dispersible blocked isocyanate (WBI-4) having a transparent light yellow color, an effective NCO content of 6.6%, a viscosity of 880 cP/25° C., and a solid content 80%.

Example 5

100 parts of the isocyanate group-terminated prepolymer which had been obtained in Synthesis Example 2, 36.1 parts of propylene glycol methyl ether acetate (hereinafter, abbreviated as "PMA"), 4.4 parts of triethylamine, 5.8 parts of dimethylol propionic acid, 2 parts of K-PON 180, and 56.7 parts of 2-ethyl hexyl alcohol were poured into a reactor vessel which was the same as that used in Synthesis Example 1, and the resultant mixture was heated up to 75° C., and was subjected to a reaction for three hours while retaining the same temperature (75° C.), thereby to obtain a water-dispersible blocked isocyanate (WBI-5) having an NCO content of 8.5%, a viscosity of 12100 cP/25° C., a solid content of 80%, a functional group number of the isocyanate-terminated precursor of 3.9 in a case where all the blocking agent had been released therefrom, a low-molecular glycol content of 4.9%, a hydrophilic surfactant content of 5.4%, and an aliphatic compound content of 1.8%.

Example 6

100 parts of the isocyanate group-terminated prepolymer which had been obtained in Synthesis Example 3, 44.3 parts of PMA, 27.8 parts of a reaction product which had been obtained by reacting polycaprolactone triol (trade name: PLACCEL 305, hydroxyl value=305, mfd. by Daicel Kagaku Kogyo Co.) and maleic anhydride in a mol ratio of 1:1, and 57.0 parts of 2-ethylhexyl alcohol were poured into a reactor vessel which was the same as that used in Synthesis Example 1, and the resultant mixture was heated up to 75° C., and was subjected to a reaction for three hours while retaining 75° C. Further, 1.9 parts N,N'-dimethyl ethanolamine was added to the resultant mixture, and stirred at 70° C. for 30 minutes, thereby to obtain a water-dispersible blocked isocyanate (WBI-6) having an NCO content of 7.6%, a viscosity of 5,300 cP/25° C., a solid content of 80%, a functional group number of the isocyanate-terminated precursor of 4.1 in a case where all the blocking agent had been released therefrom, a low-molecular glycol content of 0.6%, and a hydrophilic surfactant content of 21.8%.

Example 7

100 parts of the isocyanate group-terminated prepolymer which had been obtained in Synthesis Example 4, 37.2 parts of butylcarbitol acetate, and 48.6 parts of ε-caprolactam were poured into a reactor vessel which was the same as that used in Synthesis Example 1, and the resultant mixture was heated up to 70° C. under mixing and stirring, and was subjected to a reaction for three hours at the same temperature (70° C.). Further, 0.01 part DBTDL was added to the resultant mixture, and subjected to a reaction at 70° C. for ten hours, thereby to obtain a water-dispersible blocked isocyanate (WBI-7) having a transparent light yellow color, an NCO content of 9.3%, a viscosity of 1200 cP/25° C., a solid content of 80%, a functional group number of the isocyanate group-terminated precursor of 3.4 in a case where all the blocking agent had been released therefrom, a low-molecular glycol content of 3.0%, and a hydrophilic surfactant content of 12.4%.

Comparative Example 1

The synthetic procedure was repeated in the same manner as in Example 1 except that the 1,3-butanediol was not used, thereby to obtain a water-dispersible blocked isocyanate (WBI-8).

Comparative Example 2

100 parts of the isocyanate group-terminated precursor which had been obtained in Synthesis Example 3, and 105 parts of methoxy PEG # 400 were poured into a reactor vessel which was the same as that used in Synthesis Example 1, and the resultant mixture was heated up to 75° C., and was subjected to a reaction for three hours while retaining the same temperature (75° C.), thereby to obtain an isocyanate group-terminated prepolymer having an NCO content of 5.0%, a viscosity of 4100 cP/25° C., a functional group number of 1.8, a low-molecular glycol content of 0.4%, and a content of hydrophilic surfactant of 51.2%.

100 parts of the resultant isocyanate group-terminated prepolymer was mixed with 12.3 parts of MEK at room temperature. Further, 10.6 parts of methyl ethyl ketooxime was dropped from a dripping funnel to the thus obtained mixture so as to provide a dropping period of time of 30 minutes, and further the resultant mixture was subjected to a reaction at 70° C. for two hours, thereby to obtain a water-dispersible blocked isocyanate (WBI-9) having a transparent light yellow color, an effective NCO content of 4.1%, a viscosity of 830 cP/25° C., and a solid content 90%.

The results obtained in the above Examples 1–7 and Comparative Examples 1 and 2 are inclusively shown in the following (Table 1) and (Table 2).

TABLE 1

| | | Examples | | | | |
|---|---|---|---|---|---|---|
| | | 1 WBI-1 | 2 WBI-2 | 3 WBI-3 | 4 WBI-4 | 5 WBI-5 |
| isocyanate group-terminated precursor | low-molecular glycol content (%) | 2.2 | 22 | 1.9 | 1.8 | 4.9 |
| | hydrophilic surfactant content (%) | 13.7 | 10.3 | 14.5 | 16.5 | 5.4 |
| | hydrophobic organic compound content (%) | — | 3.4 | 13.0 | 14.8 | 1.8 |
| | functinal group number | 3.5 | 3.5 | 3.0 | 2.8 | 3.9 |
| brocked isocyanate composition | blocking agent | Mo | Mo | Cp | Cp | Oc |
| | solid content (%) | 80 | 80 | 80 | 80 | 80 |
| | effective NCO content (%) | 9.8 | 9.7 | 7.1 | 6.6 | 8.5 |
| | viscosity (cp/25° C.) | 650 | 670 | 1,000 | 880 | 12,100 |

TABLE 2

| | | Examples | | Comparative Examples | |
|---|---|---|---|---|---|
| | | 6 WBI-6 | 7 WBI-7 | 1 WBI-8 | 2 WBI-9 |
| isocyanate group-terminated precursor | low-molecular glycol content (%) | 0.6 | 3.0 | 0 | 0.4 |
| | hydrophilic surfactant content (wt %) | 21.8 | 12.4 | 13.7 | 51.2 |
| | hydrophobic organic compound content (wt %) | — | — | — | — |
| | functinal group number | 3.9 | 3.4 | 3.5 | 1.8 |
| brocked isocyanate composition | blocking agent | Oc | Cp | Mo | Mo |
| | solid content (%) | 80 | 80 | 80 | 90 |
| | effective NCO content (%) | 7.6 | 9.3 | 10.1 | 4.1 |
| | viscosity (cp/25° C.) | 5,300 | 1,200 | 960 | 830 |

The abbreviations appearing in the above (Table 1) and (Table 2) have the following meanings.

Mo: methyl ethyl ketone oxime

Cp: ε-caprolactam

Oc: 2-ethylhexyl alcohol

Example 8–14 and Comparative Examples 3–4

(Preparation of water-base system paint compositions)

Water-base system paint compositions shown in the following (Table 3) and (Table 4) were prepared by using the water-dispersible polyisocyanates obtained in the above Example 1–7 and Comparative Examples 1 and 2, respectively.

TABLE 3

| | | Examples | | | | |
|---|---|---|---|---|---|---|
| | | 8 | 9 | 10 | 11 | 12 |
| blocked isocyanate composition | WBI-1 | 46.6 | | | | |
| | WBI-2 | | 46.9 | | | |
| | WBI-3 | | | 63.0 | | |
| | WBI-4 | | | | 67.6 | |
| | WBI-5 | | | | | 53.2 |
| water-soluble resin | Almatex WA911 | 330.5 | 330.5 | 324.8 | 323.2 | 328.2 |

TABLE 3-continued

| | | Examples | | | | |
|---|---|---|---|---|---|---|
| | | 8 | 9 | 10 | 11 | 12 |
| pigment | titanium oxide | 226.3 | 226.2 | 222.4 | 221.4 | 224.7 |
| neutralizing agent | DMEA | 15.2 | 15.2 | 15.0 | 14.9 | |
| | TEA | | | | | 17.2 |
| | water | 381.4 | 381.2 | 374.8 | 372.9 | 376.7 |
| | total | 1000 | 1000 | 1000 | 1000 | 1000 |

TABLE 4

| | | Examples | | Comparative Examples | |
|---|---|---|---|---|---|
| | | 13 | 14 | 3 | 4 |
| blocked isocyanate composition | WBI-6 | 59.0 | | | |
| | WBI-7 | | 48.8 | | |
| | WBI-8 | | | 45.3 | |
| | WBI-9 | | | | 104.6 |
| water-soluble resin | Almatex WA911 | 326.2 | 329.8 | 331.0 | 310.4 |
| pigment | titanium oxide | 223.3 | 225.7 | 226.6 | 212.5 |
| neutralizing agent | DMEA | | | | |
| | TEA | 17.1 | 17.2 | 17.3 | 16.2 |
| | water | 374.4 | 378.5 | 379.8 | 356.3 |
| | total | 1000 | 1000 | 1000 | 1000 |

The abbreviations appearing in the above (Table 3) and (Table 4) have the following meanings.

Almatex WA911: aqueous solution of an acrylic resin (mfd. by Mitsui Toatsu Kagaku K.K.)

DMEA: N,N-dimethyl-N-ethanolamine

TEA : triethylamine

[Paint film test]

Each of the "paint" compositions shown in the above (Table 3) and (Table 4) was applied onto an aluminum plate (trade name: A1050P, mfd. by Nippon Test Panel Industry Co.) and was formed into a paint film by using a bar-coater so as to provide a dry paint film thickness of 30–40 μm, and then heat-treated under conditions suitable for each water-dispersible polyisocyanate. The heat-treating conditions for each paint compositions using a water-dispersible blocked isocyanate composition are as follows.

<Conditions for heat treatment>

Examples 8–9 and Comparative Examples 3–4: 140° C.×20 minute

Examples 10, 11 and 14

160° C.×20 minute

Examples 12 and 13

180° C.×20 minute

The gloss of the above paint film was measured by using a glossmeter in terms of relative-specular glossiness at an angle of incidence of 60 degrees and an angle of reflection of 60 degrees. The water resistance of the paint film was evaluated by immersing the paint film in city water (or tap water) of 20° C. for one day, and thereafter observing the condition of the resultant painted surface with the naked eye. The thus obtained results are shown in the above (Table 4).

It will be understood from the above (Table 4) that the compatibility of a self-emulsifying type polyisocyanate with the resin contained in a main component has been improved, and the resultant gloss has been improved by introducing a low-molecular glycol is introduced into the self-emulsifying type polyisocyanate.

TABLE 5

|  | appearance | gloss | water resistance |
|---|---|---|---|
| Example 8 | ○ | 88 | ○ |
| Example 9 | ○ | 85 | ○ |
| Example 10 | ○ | 91 | ○ |
| Example 11 | ○ | 90 | ○ |
| Example 12 | ○ | 92 | ○ |
| Example 13 | ○ | 88 | ○ |
| Example 14 | ○ | 92 | ○ |
| Comparative Example 3 | X | 56 | ○ |
| Comparative Example 4 | ○ | 91 | X |

The respective symbols in the above (Table 5) have the following meanings.

<Appearance>

○: Gloss was observed (Degree of the gloss was 60 or more).

X: Gloss or luster was not observed (Degree of the gloss was below 60).

<Water resistance>

○: No abnormality was observed.

X: Whitening or milkiness was observed.

Example 15

[Preparation of water-base system adhesive composition]
(Preparation of urethane emulsion)

252.3 parts of Nippolan-980N (polycarbonate-type polyol, number-average molecular weight=2000, mfd. by Nippon Polyurethane Kogyo K.K.) and 61.1 parts of IPDI were poured into a reactor vessel (made of glass, having an inner volume of 2000 ml) equipped with a stirrer, a thermometer, a nitrogen sealing tube, and a condenser, and the resultant mixture was heated up to 75° C., and was subjected to a reaction for one hour while maintaining the same temperature (75° C.). Then, the thus obtained reaction mixture was cooled to 40° C., and 16.8 parts of dimethylol propionic acid, 12.7 parts of triethylamine, and 128.8 parts of acetone were added thereto, and subjected to a reaction for three hours, thereby to obtain a reaction mixture liquid having an NCO content of 0.45%.

Further, 191.8 parts of acetone, and 3.1 parts of monoethanolamine were added to the resultant reaction mixture liquid, and subjected to a reaction at 30° C. for 20 minutes. 777.7 parts of water was added to the above reaction mixture liquid and the resultant mixture was stirred at a high speed, thereby to convert the phase thereof from a W/O type into an O/W type. Subsequently, the acetone was distilled off from this liquid by using a rotary evaporator (trade name: RE47, mfd. by Yamato Scientific Co.) at a temperature of 50° C., and at a reduced pressure of 150–300 Torr, thereby to obtain a urethane emulsion having a solid content of 30.0% and a viscosity of 540 cP/25° C.

Water-base system adhesive compositions as shown in the following (Table 6) were prepared by using the thus obtained urethane emulsion and the water-dispersible blocked isocyanates obtained in Examples and Comparative Example 2.

TABLE 6

|  |  | Examples | | Comparative Examples |
|---|---|---|---|---|
|  |  | 15 | 16 | 5 |
| blocked isocyanate composition | Example 1 | 63.6 | | |
|  | Example 6 | | 80.5 | |
|  | Comparative Example 2 | | | 139.4 |
| urethane emulsion | | 936.4 | 919.5 | 860.6 |
| total | | 1000 | 1000 | 1000 |

[Evaluation of adhesive strength]

Each of an aluminum sheet having a thickness of 3 mm and "Bonde" steel plate having a thickness of 3 mm was defatted by using trichloroethylene. Each of the compositions shown in the above (Table 5) was applied onto teach of the thus defatted plates so as to provide a drying film thickness of 40–50 μm.

Subsequently, the resultant product was preliminarily dried at 80° C. for five minutes, and each of the same plate was superposed onto each of the above plates (the above composition was applied onto one of those plates to be superposed with each other) so that no bubbles entered the clearance between these plates, and the resultant product was heat-treated under conditions suited for each water-dispersible polyisocyanate while pressing under a pressure of 25 kg/cm2. The heating conditions for the adhesive using each water-dispersible blocked isocyanate composition are as follows.

<Conditions for heat treatment>

Example 15 and Comparative Example 5

140° C.×20 minute

Example 16

160° C.×20 minute

Thereafter, each of the above plates after drying was cut so as to provide a width of 25 mm, and the adhesive strength (kgf/25mm) thereof was measured in accordance with JIS K6854 by using a tensile strength tester (trade name: Tensilon UTM-500, mfd. by Orientec Co.) under a condition of a pulling speed of 100 mm/min. The thus obtained results are shown in the following Table 7.

TABLE 7

|  | aluminum plate | bonde steel plate |
|---|---|---|
| Example 15 | 37 | 41 |
| Example 16 | 39 | 43 |
| Comparative Example 5 | 20 | 23 |

It will be easily understood from the above Table 7 that the adhesive strength has been improved by introducing a low-molecular glycol into the water-dispersible blocked isocyanate composition in a well-balanced manner.

According to the present invention, there is provided a water-dispersible blocked isocyanate composition, comprising an isocyanate group-terminated precursor and a blocking agent for blocking a free isocyanate group of the precursor; the isocyanate group-terminated precursor comprising at least an organic diisocyanate, a low-molecular glycol, and a hydrophilic surfactant having at least one active hydrogen group; the precursor having:

an isocyanurate ring structure;

an average functional group number (f) satisfying $2.0 \leq f \leq 4.2$;

a low-molecular glycol content (X) satisfying $0.5$ wt. $\% \leq X \leq 15$ wt. %; and a hydrophilic surfactant content (Y) satisfying $0.1$ wt. $\% \leq Y \leq 50$ wt. %.

The present invention also provides a water-dispersible blocked isocyanate composition, comprising an isocyanate group-terminated precursor and a blocking agent for blocking a free isocyanate group of the precursor; the isocyanate group-terminated precursor comprising at least an organic diisocyanate, a low-molecular glycol, a hydrophilic surfactant having at least one active hydrogen group, and a hydrophobic organic compound having at least one active hydrogen group and a carbon number of 7 or more; the precursor having:

an isocyanurate ring structure;

an average functional group number (f) satisfying $2.0 \leq f \leq 4.2$;

a low-molecular glycol content (X) satisfying $0.5$ wt. $\% \leq X \leq 15$ wt. %;

a hydrophilic surfactant content (Y) satisfying $0.1$ wt. $\% \leq Y \leq 50$ wt. %; and of hydrophobic organic compound content (Z) satisfying $0$ wt. $\% < Z \leq 30$.

The present invention further provides a water-dispersible blocked isocyanate composition, comprising an isocyanate group-terminated precursor and a blocking agent for blocking a free isocyanate group of the precursor; the isocyanate group-terminated precursor comprising at least an organic diisocyanate, a low-molecular glycol, and a hydrophilic surfactant having at least one active hydrogen group;

the blocked isocyanate composition having a viscosity of 100–100,000 mPa.s/25° C. in the state of a solution in an organic solvent having a solid content of 80%.

The present invention further provides a water-dispersible blocked isocyanate composition, comprising an isocyanate group-terminated precursor and a blocking agent for blocking a free isocyanate group of the precursor; the isocyanate group-terminated precursor comprising at least an organic diisocyanate, a low-molecular glycol, and a hydrophilic surfactant having at least one active hydrogen group;

the blocked isocyanate composition having an effective NCO content of 4.0–15.0 wt. % in the state of a solution in an organic solvent having a solid content of 80%.

The present invention further provides a water-dispersible blocked isocyanate composition, comprising an isocyanate group-terminated precursor and a blocking agent for blocking a free isocyanate group of the precursor; the isocyanate group-terminated precursor comprising at least an organic diisocyanate, a low-molecular glycol, and a hydrophilic surfactant having at least one active hydrogen group;

the blocked isocyanate composition having a gloss of 60–100 in the state of a paint for gloss measurement at an incidence angle of 60° and a reflection angle of 60°.

The present invention further provides a water-base paint composition, comprising at least a water-dispersible blocked isocyanate composition, and a water-base resin having an active hydrogen group, wherein the mole of the blocked isocyanate groups in the water-dispersible blocked isocyanate composition, and the mole of the active hydrogen groups of the resin constituting the water-base resin being 1:9 to 9:1;

the blocked isocyanate composition comprising an isocyanate group-terminated precursor and a blocking agent for blocking a free isocyanate group of the precursor; the isocyanate group-terminated precursor comprising at least an organic diisocyanate, a low-molecular glycol, and a hydrophilic surfactant having at least one active hydrogen group.

The present invention further provides a water-base adhesive composition, comprising at least a water-dispersible blocked isocyanate composition, and a water-base resin having an active hydrogen group, wherein the mole of the blocked isocyanate groups in the water-dispersible blocked isocyanate composition, and the mole of the active hydrogen groups of the resin constituting the water-base resin being 1:9 to 9:1;

the blocked isocyanate composition comprising an isocyanate group-terminated precursor and a blocking agent for blocking a free isocyanate group of the precursor; the isocyanate group-terminated precursor comprising at least an organic diisocyanate, a low-molecular glycol, and a hydrophilic surfactant having at least one active hydrogen group.

As described above, a low-molecular glycol (and a hydrophobic organic compound having an appropriate chain length, as desired) is introduced into the water-dispersible blocked isocyanate according to the present invention in a well-balanced manner, in addition to a hydrophilic surfactant which has been introduced thereinto in the art for the purpose of improving the dispersibility, thereby to attain an improvement in the compatibility thereof with the molecular skeleton of a water-soluble polymer solution or aqueous emulsion. Further, in the present invention, the introduction of an isocyanurate ring structure for providing good weather resistance and heat resistance, may improve the gloss and definition, as well as weather resistance and heat resistance, in a case where the isocyanate is formed into a paint film.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 286050/1996 filed on Oct. 8, 1996 is hereby incorporated by reference.

What is claimed is:

1. A method for producing water-dispersible blocked isocyanate composition, comprising:
    addition-reacting a low-molecular glycol with an organic isocyanate to obtain a first product;
    adding to said first product an isocyanurate-forming catalyst to introduce into said first product an isocyanurate ring structure to obtain a second product;
    removing the free organic isocyanate from said second product to obtain a substantially monomeric organic isocyanate free third product;
    reacting a hydrophilic surfactant with said third product to obtain an isocyanurate group-terminated precursor; and
    reacting a blocking agent for blocking a free isocyanate group of said isocyanurate group-terminated precursor with said isocyanurate group-terminated precursor to obtain said water-dispersible blocked isocyanate composition.

2. A method for producing water-dispersible blocked isocyanate composition according to claim 1, wherein said organic isocyanate is hexamethylene-1,6-diisocyanate, said hydrophilic surfactant has at least one active hydrogen group, comprises poly(oxyethylene)glycol having a degree of polymerization of 3–90 and is introduced in the amount of 0.1 wt %–50 wt %.

3. A method for producing water-dispersible blocked isocyanate composition according to claim 1, including further reacting a hydrophobic organic compound with said third product simultaneously with said hydrophilic surfactant.

4. A method for producing water-dispersible blocked isocyanate composition according to claim 3, wherein said hydrophobic organic compound has at least one active hydrogen group and a carbon number of 7 or more.

5. A method for producing water-dispersible blocked isocyanate composition, comprising:
    addition-reacting a low-molecular glycol with an organic isocyanate and simultaneously adding an isocyanurate-forming catalyst to obtain a product having an isocyanurate ring structure;
    reacting a hydrophilic surfactant with said product having an isocyanurate ring structure to obtain an isocyanurate group-terminated precursor; and
    reacting a blocking agent for blocking a free isocyanate group of said isocyanurate group-terminated precursor with said isocyanurate group-terminated precursor to obtain said water-dispersible blocked isocyanate composition.

6. A method for producing water-dispersible blocked isocyanate composition according to claim 5, wherein said organic isocyanate is hexamethylene-1,6-diisocyanate, said hydrophilic surfactant has at least one active hydrogen group, comprising poly(oxyethylene)glycol having a degree of polyermization of 3–90 and is introduced in the amount of 0.1 wt %–50 wt %.

7. A method for producing water-dispersible blocked isocyanate composition according to claim 5, including further reacting a hydrophobic organic compound with said product having an isocyanurate ring structure simultaneously with said hydrophilic surfactant.

8. A method for producing water-dispersible blocked isocyanate composition according to claim 7, wherein said hydrophobic organic compound has at least one active hydrogen group and a carbon number of 7 or more.

9. A method for producing water-dispersible blocked isocyanate composition, comprising
    reacting a low-molecular glycol and a hydrophilic surfactant with an organic isocyanate to obtain a reaction product;
    adding an isocyanurate-forming catalyst with said reaction product and removing the free organic isocyanate to obtain an isocyanurate group-terminated precursor having an isocyanurate ring structure; and
    reacting a blocking agent for blocking a free isocyanate group of said isocyanurate group-terminated precursor with said isocyanurate group-terminated substantially monomeric organic isocyanate free precursor to obtain said water-dispersible blocked isocyanate composition.

10. A method for producing water-dispersible blocked isocyanate composition according to claim 9, wherein said organic isocyanate is hexamethylene-1,6-diisocyanate, said hydrophilic surfactant has at least one active hydrogen group, comprises poly(oxyethylene)glycol having a degree of polymerization of 3–90 and is introduced in the amount of 0.1 wt %–50 wt %.

11. A method for producing water-dispersible blocked isocyanate composition according to claim 9, including further reacting a hydrophobic organic compound with said organic isocyanate simultaneously with said hydrophilic surfactant.

12. A method for producing water-dispersible blocked isocyanate composition according to claim 11, wherein said hydrophobic organic compound has at least one active hydrogen group and a carbon number of 7 or more.

13. A method for producing water-dispersible blocked isocyanate composition, comprising:
    reacting a lower-molecular glycol and a hydrophilic surfactant with an organic isocyanate and simultaneously adding an isocyanurate-forming catalyst to obtain an isocyanurate group-terminated precursor having an isocyanurate ring structure; and
    reacting a blocking agent for blocking a free isocyanate group of said isocyanurate group-terminated precursor with said isocyanurate group-terminated precursor to obtain said water-dispersible blocked isocyanate composition.

14. A method for producing water-dispersible blocked isocyanate composition according to claim 13, wherein said organic isocyanate is hexamethylene-1,6-diisocyanate, said hydrophilic surfactant has at least one active hydrogen group, comprises poly(oxyethylene)glycol having a degree of polymerization of 3–90 and is introduced in the amount of 0.1 wt %–50 wt %.

15. A method for producing water-dispersible blocked isocyanate composition according to claim 13, including further reacting a hydrophobic organic compound with said organic isocyanate simultaneously with said hydrophilic surfactant.

16. A method for producing water-dispersible blocked isocyanate composition according to claim 15, wherein said hydrophobic organic compound has at least one active hydrogen group and a carbon number of 7 or more.

17. A method for producing water-dispersible blocked isocyanate composition according to claim 1, wherein the low-molecular glycol is a glycol having a side chain.

18. A method for producing water-dispersible blocked isocyanate composition according to claim 5, wherein the low-molecular glycol is a glycol having a side chain.

19. A method for producing water-dispersible blocked isocyanate composition according to claim 9, wherein the low-molecular glycol is a glycol having a side chain.

20. A method for producing water-dispersible blocked isocyanate composition according to claim 13, wherein the low-molecular glycol is a glycol having a side chain.

21. A method for producing water-dispersible blocked isocyanate composition according to claim 1, wherein said low-molecular glycol has a molecular weight of 75–250, the amount of said low-molecular glycol introduced is 0.5 wt %~15 wt %.

22. A method for producing water-dispersible blocked isocyanate composition according to claim 5, wherein said low-molecular glycol has a molecular weight of 75–250, the amount of said low-molecular glycol introduced is 0.5 wt %~15 wt %.

23. A method for producing water-dispersible blocked isocyanate composition according to claim 9, wherein said low-molecular glycol has a molecular weight of 75–250, the amount of said low-molecular glycol introduced is 0.5 wt %~15 wt %.

24. A method for producing water-dispersible blocked isocyanate composition according to claim 13, wherein said low-molecular glycol has a molecular weight of 75–250, the amount of said low-molecular glycol introduced is 0.5 wt %~15 wt %.

* * * * *